US012769648B2

(12) United States Patent
Lin et al.

(10) Patent No.: US 12,769,648 B2
(45) Date of Patent: Oct. 20, 2026

(54) MEMORY RESET READ USING PRIORITY-BASED BLOCK POOL

(71) Applicant: Micron Technology, Inc., Boise, ID (US)

(72) Inventors: Lei Lin, Fremont, CA (US); Joshua C. Garrison, Folsom, CA (US); Yuxing Liu, San Jose, CA (US); Go Shikata, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 140 days.

(21) Appl. No.: 18/789,442

(22) Filed: Jul. 30, 2024

(65) Prior Publication Data

US 2026/0037424 A1 Feb. 5, 2026

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
See application file for complete search history.

(56) References Cited

U.S. PATENT DOCUMENTS 5,784,582 A * 7/1998 Hughes ................ G11C 7/1072 710/117
6,591,350 B1 * 7/2003 Stenfort .................. G06F 13/24 711/158
6,799,251 B1 * 9/2004 Jacobs ................ G06F 16/9574 711/156
6,986,016 B2 1/2006 Patil
8,531,791 B1 * 9/2013 Reid .................... G11B 19/041 360/53
11,036,415 B2 6/2021 Papandreou et al.
2016/0118132 A1 * 4/2016 Prins ..................... G06F 11/076 714/704
2016/0179678 A1 6/2016 Camp et al.
2019/0066771 A1 * 2/2019 Binfet ...................... G11C 7/20
2019/0074053 A1 * 3/2019 Bang ................... G06F 12/0246
2020/0118637 A1 4/2020 Natarajan et al.
2020/0365201 A1 11/2020 Binfet et al.
2024/0347095 A1 * 10/2024 Hirata ................ G11C 11/4093

OTHER PUBLICATIONS

"International Application Serial No. PCT US2025 037101, International Search Report mailed Nov. 6, 2025", 3 pages.
"International Application Serial No. PCT US2025 037101, Written Opinion mailed Nov. 6, 2025", 3 pages.

* cited by examiner

*Primary Examiner* — Eric T Loonan
(74) *Attorney, Agent, or Firm* — Schwegman Lundberg & Woessner, P.A.

(57) ABSTRACT

Various embodiments described herein provide for performing a reset read operation on a memory device using a priority-based block pool, where the memory device can be part of a memory system. Various embodiments use the priority-based block pool to facilitate use of different multi-block options for performing reset read operations for different groups of consecutive blocks (e.g., during a ganged reset read or a group-based reset read (GRR) process).

20 Claims, 8 Drawing Sheets

502

| CURRENT GOOD BLOCK POOL | | | | |
|---|---|---|---|---|
| GROUP #1 | B1 | B2 | B1 | B4 |
| GROUP #2 | B5 | B7 | B8 | B1 |
| GROUP #3 | B16 | B17 | B18 | B1 |
| GROUP #4 | B20 | B21 | B22 | B1 |
| GROUP #5 | B24 | B25 | B26 | B1 |
| GROUP #6 | B28 | B29 | B33 | B1 |
| GROUP #7 | B36 | B37 | B38 | B1 |
| GROUP #8 | B40 | B41 | B42 | B1 |
| GROUP #9 | B45 | B47 | B48 | B1 |
| GROUP #10 | B52 | B53 | B54 | B1 |
| • • • | • • • | • • • | • • • | • • • |

504

| PRIORITY-BASED BLOCK POOL | | | | | LENGTH AND RANGE |
|---|---|---|---|---|---|
| GROUP #1 | B16 | B17 | B18 | B19 | 12, FROM B16-B27 |
| | B20 | B21 | B22 | B23 | |
| | B24 | B25 | B26 | B27 | |
| GROUP #2 | B36 | B37 | B38 | B39 | 8, FROM B36 TO B43 |
| | B40 | B41 | B42 | B43 | |
| GROUP #3 | B1 | B2 | B3 | B4 | 4, FROM B1 TO B4 |
| GROUP #4 | B52 | B53 | B54 | B55 | • • • |
| GROUP #5 | B47 | B48 | B49 | | |
| GROUP #6 | B7 | B8 | | | |
| GROUP #7 | B28 | B29 | | | |
| GROUP #8 | B33 | B34 | | | |
| GROUP #9 | B5 | | | | |
| GROUP #10 | B12 | | | | |
| GROUP #11 | B45 | | | | |
| • • • | • • • | | | | |

FIG. 5

MEMORY RESET READ USING PRIORITY-BASED BLOCK POOL

TECHNICAL FIELD

Embodiments of the disclosure relate generally to memory systems and, more specifically, to performing a reset read operation on a memory device using a priority-based block pool, where the memory device can be part of a memory system (e.g., memory sub-system).

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 and FIG. 6 are diagrams illustrating use of a priority-based block pool to perform a reset read operation on a memory device, in accordance with some embodiments of the present disclosure.

DETAILED DESCRIPTION

Figure 1:
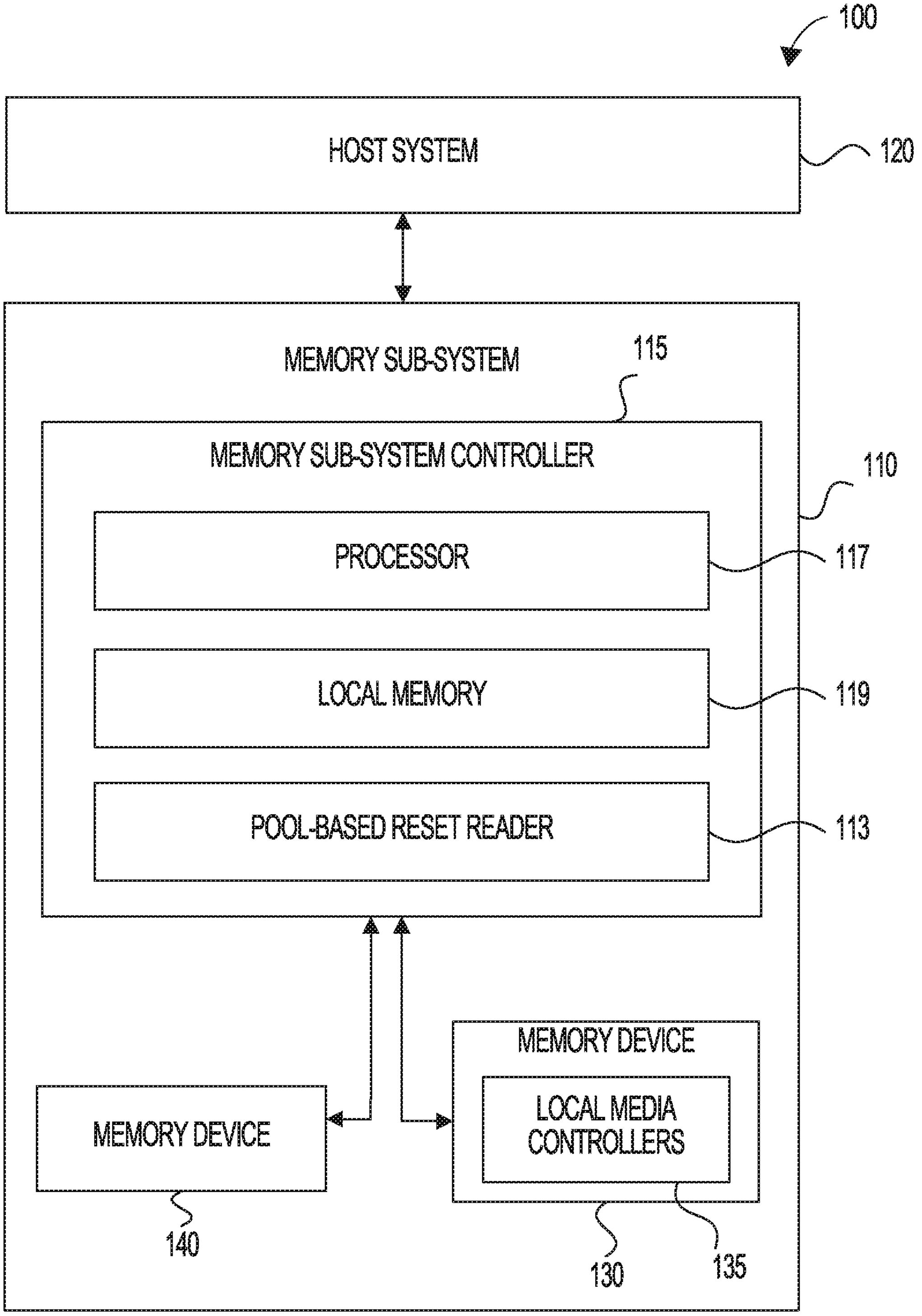
FIG. 1 is a block diagram illustrating an example computing system that includes a memory sub-system, in accordance with some embodiments of the present disclosure.

Aspects of the present disclosure are directed to performing a reset read operation on a memory device using a priority-based block pool, where the memory device can be part of a memory system (e.g., memory sub-system). A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of a garbage collection management operation (or garbage collection process). The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred to as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

Three-dimensional (3D) NAND-type memory devices (comprising 3D NAND-type memory cells) represent an advancement over traditional two-dimensional (2D) NAND-type memory devices (comprising 2D NAND-type memory cells) with their higher density and efficiency. One of the persistent challenges in 3D NAND-type memory devices is the unstable read behavior exhibited by its memory cells, which primarily arises from an apparent shift in the voltage threshold of the memory cells due to the trapping and annihilation of charges around the memory cells.

During the programming operation of memory cells of a 3D NAND-type memory device (when data is being written to the memory cells), the memory cells enter what is known as a "transient state" (or transient threshold voltage (Vt) state), where the internal charge structures of the memory cells are temporarily unstable. In this state, the structures within the memory cells are charged and gradually return to a "stable state" (or stable threshold voltage (Vt) state) over time. Generally, reading (or retrieving) stored data from memory cells that are in the transient state results in fewer read errors than when the memory cells are in a stable state. In other words, while programmed 3D NAND-type memory cells can transition between a transient state (e.g., with a better read window budget (RWB)) and a stable state (e.g., with a worse RWB), programmed 3D NAND-type memory cells are usually designed to be read in the transient state.

To mitigate the impact of reading from a 3D NAND-type memory cell that is in a stable state (e.g., during a first page read), some memory systems can support a ganged reset read or a group-based reset read (GRR) process), which initiates a reset read operation that only ramps up one or more wordlines (WLs) of a memory device to a predetermined voltage (e.g., Vpassr, which can represent the voltage bias applied on a wordline) and then discharges the one or more wordlines, thereby causing memory cells (e.g., pages) of the memory device associated with the one or more wordlines to be returned to a transient state. Generally, a GRR process causes a reset read to be performed one or more times on multiple (e.g., all) wordlines of one or more consecutive ordinal blocks of a memory device. A GRR process can be executed during a program suspension (e.g., within a few hundred microseconds) and during memory system power-on (e.g., within a few seconds). Overall, a GRR process can expedite the transition of blocks of a memory device from a stable state to a transient state.

The GRR process can use of a reset read operation with a single-block option or configuration (e.g., ×1 option) where a reset read is performed in parallel on multiple wordlines (e.g., all wordlines) of a single block of a memory device (e.g., across one or more memory die planes of one or more memory die). The GRR process can also use a reset read operation with a specific multi-block option or configuration (e.g., 4×, 16×, 64× option), where a reset read is performed in parallel on multiple wordlines (e.g., all wordlines) of a group of consecutive blocks of a memory device (e.g., ×64 option to perform a reset read in parallel on a group of sixty-four consecutive blocks). As used herein, a reset read performed on a block ramps up one or more wordlines (e.g., all wordlines) of the block in parallel to a predetermined voltage (e.g., Vpassr, which can represent the voltage bias applied on a wordline) and then discharge the one or more wordlines, which causes memory cells associated with the one or more wordlines to be placed in a transient state. A reset read operation generally does not involve reading any data memory cells connected to the wordlines (e.g., no transfer of data to any data latch of the memory device). In comparison, a non-reset read operation can comprise a read operation that involves reading data from memory cells connected to one or more wordlines (e.g., transfer of data to at least one data latch of the memory device). As used herein, ganged blocks can refer to a group (or grouping) of consecutive blocks on which a single instance of reset read operation is performed. A reset reading operation with a single-block option can be regarded as performing a reset read on a group of blocks comprising a single block.

For conventional implementations of GRR processing, there are at least two limitations when performing a reset read operation with a multi-block option on a group of blocks (on one or more memory die planes): the physical block addresses of the group of blocks need to be consecutive; and there should be no bad blocks (e.g., BBs) within the group of (consecutive) blocks being operated upon. Traditionally, when a GRR process performs a reset read operation with a multi-block option on a given group of consecutive blocks of a memory device, the GRR process scans the group of consecutive blocks to determine whether the group of consecutive blocks includes at least one bad block. In response to detecting one or more bad blocks in the group of consecutive blocks, the GRR process uses only a reset read operation with a single-block option on the group of consecutive blocks, where a reset read is individually performed on each of non-bad blocks of the group while skipping a reset read of any identified bad blocks. For instance, assume that a GRR process is using a reset read operation with a four-block option (e.g., ×4 option) to perform reset reads (four consecutive blocks in parallel at a time) on blocks of memory die planes P0 through P5 (e.g., of a single NAND-type memory die) of a memory device. Assume further that during the performance of the GRR process, the GRR process determines (e.g., detects) that block 1 on memory die plane P3 is a bad block. Block 1 could, for example, have a defect such as a wordline-to-pillar short, where a wordline of a memory die is trying to be biased (e.g., to ~6V), while a pillar of the memory die is usually at 0V. In such a defect case, the GRR process cannot use the reset read operation with a four-block option (also referred to herein as a four-block reset read operation) to effectively reset blocks 0 through 3 on P3 to a transient state given that the bias applied on the wordline (during the four-block reset read operation) will likely be much lower than the bias voltage (e.g., less than ~6V). As a result of determining (e.g., detecting) that block 1 on P3 is a bad block, the conventional GRR process would perform a reset read operation with a single-block option (also referred to herein as a single-block reset read operation) exclusively on each of blocks 0, 2, and 3 of memory die plane P3, skip the reset read of block 1 on memory die plane P3, and perform the reset read operation with a four-block option (e.g., ×4 option) on a group of blocks 0 through 3 on each of memory die planes P0, P1, P2, P4, and P5 (e.g., either each memory die plane individually or all in parallel).

Various embodiments described herein cure or address various deficiencies of conventional memory technologies. In particular, various embodiments can maximize coverage by a GRR process and can use one or more different multi-block options for performing reset read operations (during the GRR process) for different groups of consecutive blocks. Additionally, various embodiments can significantly reduce constraints imposed by bad blocks on the reset read operation usage by a GRR process and can improve the efficiency of block scanning (by the GRR process) within a specified time limit.

According to various embodiments, a reset read operation is performed on a memory device using a priority-based block pool, where the memory device can be part of a memory system (e.g., memory sub-system). As used herein, a pool can comprise (e.g., implemented by) a data structure, such as a data array or data table, which can be maintained (e.g., generated and updated) by a memory system (e.g., a memory sub-system) for tracking information regarding a memory device, such as information regarding blocks of the memory device. Various embodiments use a priority-based block pool, which represents a new block pool type that identifies and prioritizes different groups (or groupings) of one or more consecutive blocks of a memory device for performing reset read operations. For some embodiments, each group of one or more consecutive blocks comprises good blocks. For instance, a memory system can maintain an existing pool of good blocks (e.g., current good block pool), and the priority-based block pool is generated (or otherwise maintained) by the memory system based on good blocks identified in the existing pool of good blocks. Additionally, for some embodiments, when a GRR process performs a scan for good blocks of a memory device, the GRR process can use the priority-based block pool to select an optimal reset read operation multi-block option for performing a reset read on different groups of consecutive blocks before reverting to a single-block reset read operation option.

According to some embodiments, a memory system performs a GRR process on a memory device by switching between use of different multi-block reset read operation options for different groups of consecutive blocks (with no bad blocks) across one or more memory die planes, and by using a single-block reset read operation option for individual blocks of groups that have a number of blocks that is less than the any of the different multi-block reset read operation options used. To facilitate this, some embodiments use a priority-based block pool to select an optimal multi-block option for performing one or more reset reads on different sequences (e.g., different chains) of consecutive blocks, where a priority of a given sequence of consecutive blocks is determined based on one or more factors. For example, according to some embodiments, the number of consecutive blocks within a given sequence (e.g., length of the given block chain) is used as at least one factor for prioritizing the given sequence (e.g., define the priority to the GRR process) over one or more other sequences. For instance, one or more sequences with the largest number of blocks (e.g., block chains with the longest length) can be prioritized as first priority in the priority-based block pool, one or more sequences with the second largest number of blocks (e.g., block chains with the second longest length) can be prioritized as a second priority in the priority-based block pool, and so on. As a result, reset read operations (e.g., with an appropriate multi-block option) can be first performed on one or more subsequences (e.g., groups) of blocks from the one or more largest sequences of consecutive blocks, which have a higher possibility of being selected for access (e.g., a data read) by a host system, before reset read operations (e.g., with an appropriate multi-block option or a single-block option) are performed on one or more subsequences (e.g., groups) of blocks from one or more smaller sequences of consecutive blocks. In doing so, a GRR process can cover (e.g., reset read) as many good blocks from the larger sequences during non-idle time periods of a memory system (such as during a program suspension or during memory system power-on), and can cover remaining good blocks during idle time periods of the memory system. Depending on the embodiment, the GRR process can be implemented to operate on multiple memory die planes in parallel (e.g., performing a reset read operation with a multi-block option on multiple memory die planes of a single memory die of a memory device in parallel), to operate on multiple memory die in parallel (e.g., performing reset read operation with the multi-block option on multiple die of the memory device in parallel), or both.

For some embodiments, a factor considered for prioritizing sequences of consecutive blocks identified in the priority-based block pool comprises whether blocks (e.g., non-SLC blocks, which may be used as cache blocks on the memory system) within the sequence are associated with certain data characteristics (which can also be referred to as block type), such as whether the blocks are store data associated with an operating system software of a host system, or associated with frequently accessed by the host system (e.g., photo data, movie data, book data, etc.). Additionally, some embodiments can prioritize data within a given sequence of consecutive blocks such that blocks associated with certain data characteristics (e.g., such as those described above) are prioritized for reset read operations over other blocks within the given sequence. In this way, various embodiments can incorporate block type in determining or adjusting priority within an individual sequence of consecutive blocks or across different sequences of consecutive blocks.

During power-up and exiting sleep or low-power mode (e.g., wakeup conditions), a memory system may encounter one or more blocks in a stable state, which can occur when the memory system has been powered off or in a low-power mode for an extended period. Given the importance of blocks (of a memory device) of the memory system to transition back to a transient state (e.g., operational mode) as soon as possible while considering power limitations, the memory system of some embodiments maintain flexibility in using (e.g., applying) various multi-block reset read operation options based on a current operation stage of the memory system, whereby the memory system can reduce the number of blocks that are grouped together and reset read by a GRR process immediately after a power-up condition or after exiting sleep or low-power mode. For example, the memory system of some embodiments group together (e.g., identify a subsequence of consecutive blocks having) a predetermined maximum number of blocks (e.g., four or fewer blocks) per memory die plane or per a memory die and using a multi-block option that matches that group when performing reset read operations until an initialization process (e.g., after power-up or exiting sleep/low-power mode) of the memory system completes and the memory system returns to a normal operation mode. In this way, various embodiments can perform a GRR process while optimizing memory system performance and power. Once the memory system is in normal operation mode, blocks of the memory system can be considered to be in a transient state and can be expected to exhibit a low read bit error rate (RBER). Thereafter, the memory system can maintain the low RBER by periodically performing a GRR process on sequences of consecutive blocks identified by the priority-based block pool, where reset read operations with a multi-block option is performed on larger subsequences (e.g., groups) of consecutive blocks that are selected from the sequences of consecutive blocks while respecting power load limitations of the memory system (e.g., as long as the ICC peak limitation allows for reset read of subsequences of blocks with larger numbers of blocks). For some embodiments, the memory system uses a predetermined multi-block option when performing reset read operations during different operation modes or stages of the memory system, where the predetermined multi-block option facilitates reset read of less number of blocks in parallel than a maximum multi-block option supported by the memory system. For instance, during a power-up stage of the memory system, the memory system can use a four-block or lower option (e.g., a single-block option) for performing reset reads on subsequences of blocks selected from sequences of consecutive blocks identified by the priority-based block pool. During a normal operation stage (e.g., idle state) of the memory system, the memory system can use any multi-block option supported by the memory system for performing a reset read operation on subsequences (e.g., groups) of blocks selected sequences sequence of consecutive blocks identified by the priority-based block pool, including the largest supported multi-block option (e.g., GRR ×64 option) supported by the memory system, thereby maximizing the number of blocks read rest to a transient state during the idle state. According to various embodiments, the multi-block option used to perform reset read operations (during a GRR process) on a given sequence of consecutive blocks is selected (e.g., from a range of different multi-block options supported by the memory system) based on the number of blocks in the given sequence (e.g., the multi-block option is selected to maximally match the number of blocks in the given sequence being operated on). Alternatively, for some embodiments, a single multi-block option (e.g., 4× option) is used to perform reset read operations on sequences of consecutive blocks having a number of blocks that matches or exceeds the number of blocks supported by the single multi-block option (e.g., for all sequences of consecutive blocks having 4 or more blocks), and a single-block option (e.g., 1× option) is used to perform reset read operations on sequences of consecutive blocks having less than the number of blocks supported by the single multi-block option (e.g., sequences of consecutive blocks having 3 or less blocks).

Use of various embodiments can effectively mitigate one or more limitations posed on GRR usage by defective blocks (e.g., bad blocks) of a memory device, and can enhance the efficiency of block scanning by a GRR process within a specified time frame. Various embodiments described herein can use different multi-block options for performing reset read operations (during a GRR process) in order to match the actual dimensions of groups of consecutive blocks (e.g., consecutive good blocks) from sequences of consecutive blocks, and can consider the memory system operation stage while performing reset read operations during the GRR process. Additionally, various embodiments can dynamically determine or adjust the priority of sequences of blocks, and scan priorities of blocks or sequences of consecutive blocks based on block type, such as prioritizing blocks storing frequently accessed data.

As used herein, a ganged reset read (GRR) process can comprise performing a reset read operation one or more times, with one or more different multi-block options, on one or more blocks of one or more memory devices of a memory system. As used herein, performing a reset read operation with a single-block option can comprise performing a reset read in parallel on a set of wordlines of a single block (e.g., a single ordinal block across two or more memory die planes of one or more dies) of a memory device. In comparison, performing a reset read operation with a multiple-block option (e.g., four-block option, sixteen-block option, sixty-four option, etc.) can comprise performing a reset read in parallel on a set of wordlines of a group of consecutive blocks (e.g., a group of consecutive ordinal blocks across two or more memory die planes of one or more memory dies) of a memory device. As used herein, a single-block reset read configuration (or single-block configuration) for a reset read operation can refer a single-block option for the reset read operation, and a multi-block reset read configuration (or a multi-block configuration) for the reset read operation can refer to a multi-block option for the reset read operation.

While various embodiments are described herein with respect to 3D NAND-type memory devices, techniques described herein can (e.g., after adaptation) be used with other types of memory devices, such as 2D NAND-type memory devices.

Disclosed herein are some examples of performing a reset read operation on a memory device using a priority-based block pool, where the memory device can be part of a memory system (e.g., memory sub-system), as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, single-level cells (SLCs), can store one bit per cell. Other types of memory cells, such as multiple-layer cells (MLCs), triple-layer cells (TLCs), quad-level cells (QLCs), and penta-level cells (PLCs), can store multiple bits per cell. In some embodiments, each of the memory devices 130, 140 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LB A, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a pool-based reset reader 113 that enables or facilitates the memory sub-system controller 115 to perform a reset read operation on the memory device 130 or 140 using a priority-based block pool in accordance with various embodiments described herein. Alternatively, some or all of the pool-based reset reader 113 is included by the local media controller 135, thereby enabling the local media controller 135 to enable or facilitate performance of a reset read operation on the memory device 130 using a priority-based block pool in accordance with various embodiments described herein.

Figure 2:
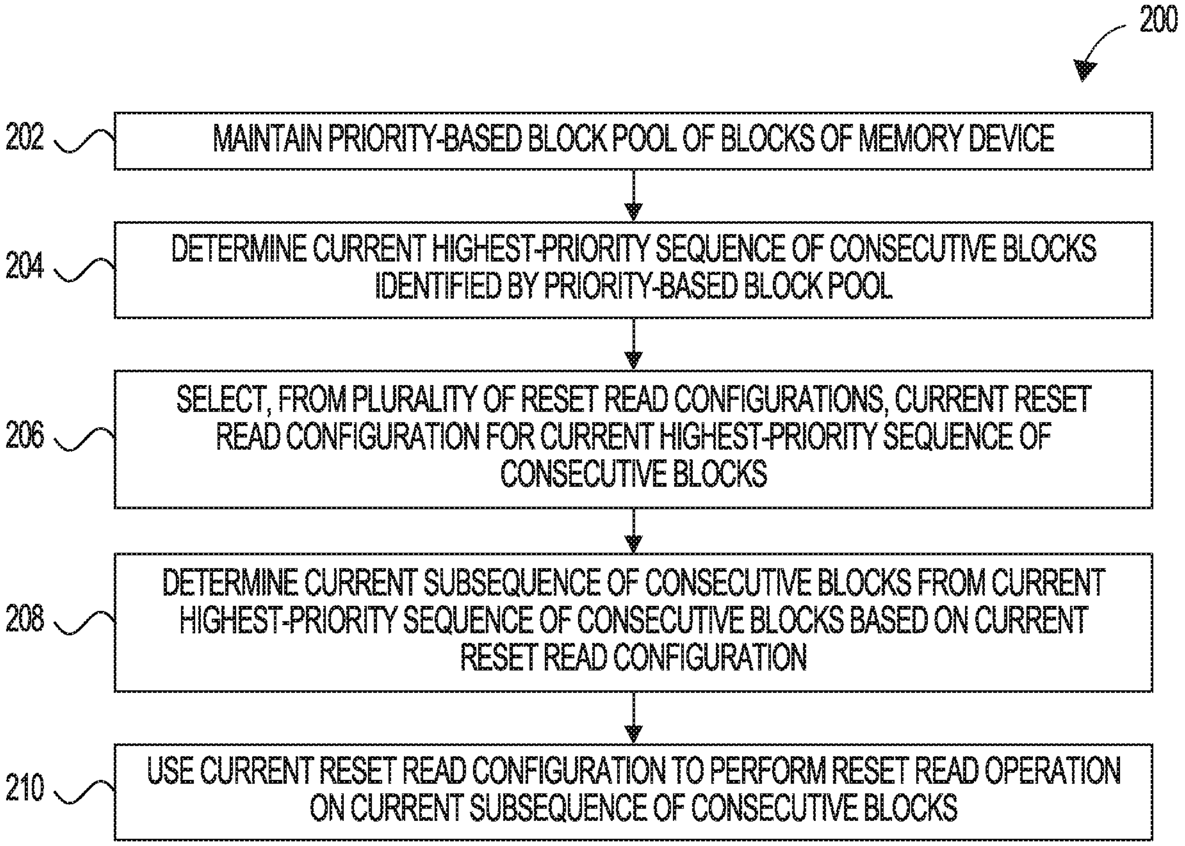
FIG. 2, FIG. 3A, FIG. 3B are flow diagrams illustrating example methods for performing a reset read operation on a memory device of a memory system using a priority-based block pool, in accordance with some embodiments of the present disclosure.
Figure 3A:
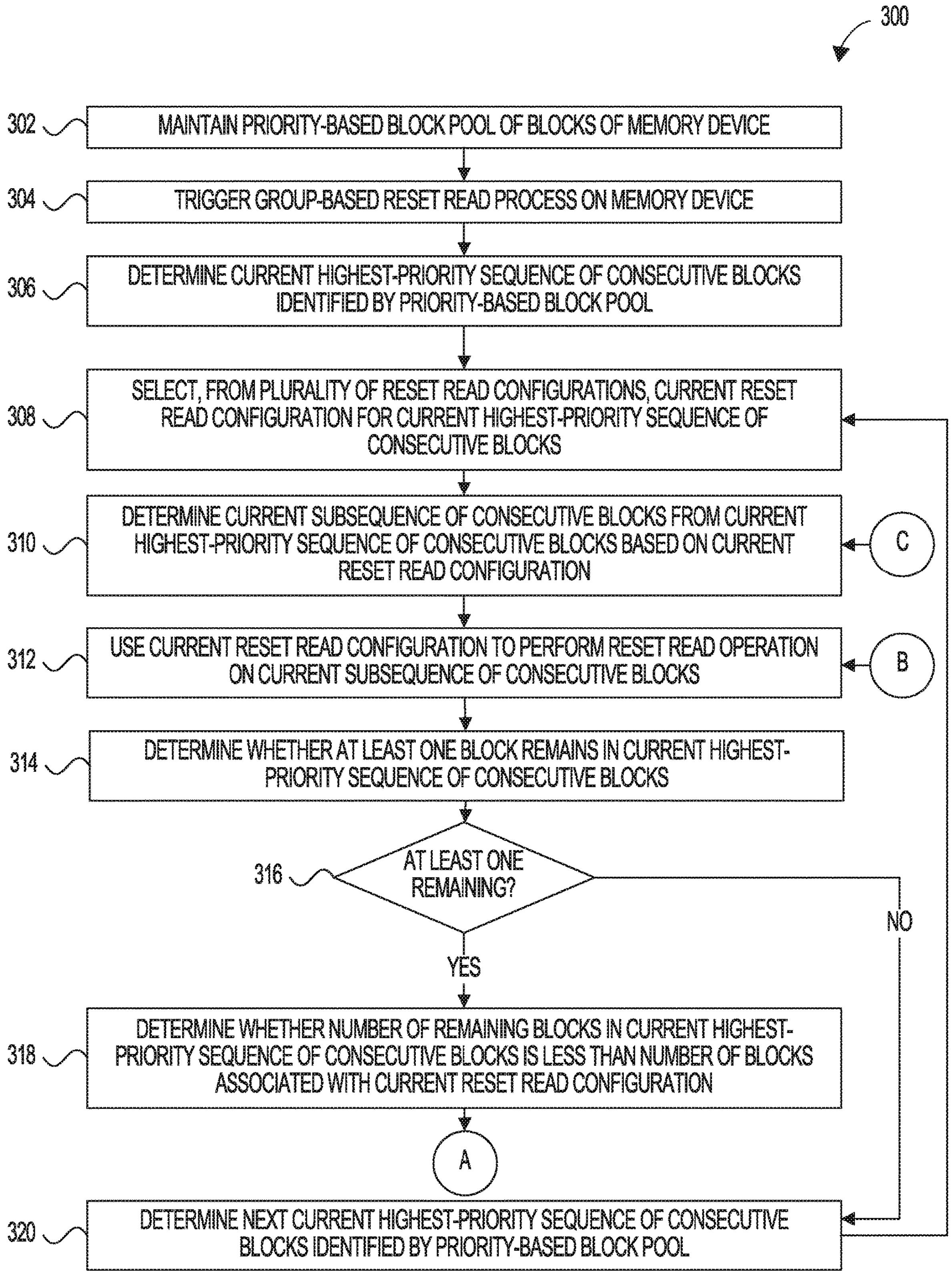
Figure 3B:
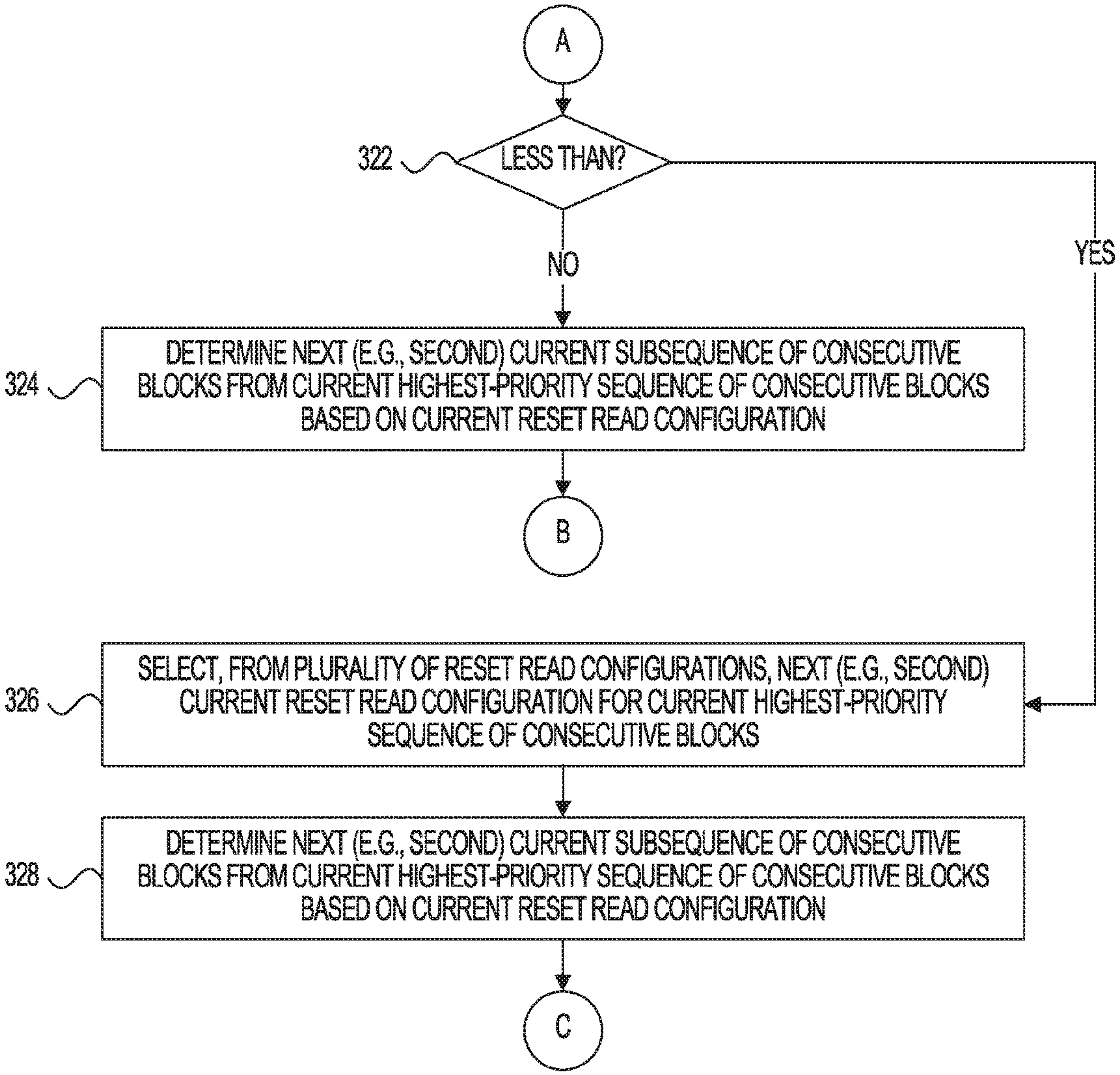

FIG. 2, FIG. 3A, FIG. 3B are flow diagrams illustrating example methods 200, 300 for performing a reset read operation on a memory device of a memory system using a priority-based block pool, in accordance with some embodiments of the present disclosure. Any of methods 200, 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, any of methods 200, 300 is performed by the memory sub-system controller 115 of FIG. 1 based on the pool-based reset reader 113. Additionally, or alternatively, for some embodiments, any of methods 200, 300 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 200 of FIG. 2, at operation 202, a processing device (e.g., the processor 117 of the memory sub-system controller 115) maintains a priority-based block pool of blocks of a memory device (e.g., 130, 140), where the priority-based block pool identifies one or more sequences (e.g., series) of consecutive blocks of the memory device, and where the one or more sequences of consecutive blocks are prioritized within the priority-based block pool based on a set of factors. For some embodiments, the set of factors comprises a factor that increases a priority of an individual sequence of consecutive blocks based on a size (e.g., length or number of blocks) of the individual sequence of consecutive blocks. For instance, a sequence comprising twelve consecutive blocks of a memory device could have a higher priority in the priori-based block pool than a sequence comprising eight consecutive blocks of the memory device. The set of factors can comprise a factor that increases the priority of an individual sequence of consecutive blocks based on a block type of blocks of the individual sequence of consecutive blocks. For example, the block type can comprise blocks that store data for an operating system of a host system (e.g., host system 120). As another example, the block type can comprise blocks that store data frequently accessed by a host system. (e.g., host system 120). Such blocks of such example block types could have a higher priority than blocks of other block types. Depending on the embodiment, the block type of a given block can be stored or described in metadata associated with (e.g., maintained by the memory sub-system 110 for) the given block. For some embodiments, the processing device maintains the priority-based block pool by determining the one or more sequences of consecutive blocks based on a good block pool maintained by the system.

Thereafter, the method 200 proceeds to operations 204 through 210, which can represent operations of a group-based reset read process that is performed on the memory device (e.g., 130, 140). The group-based reset read process can be triggered and performed on the memory device (e.g., on the memory device 130, 140 of the memory sub-system 110) under various conditions. For instance, the group-based reset read process can be triggered and performed during or shortly after a power-up stage of a memory system (e.g., memory sub-system 110) or shortly after the memory system (e.g., memory sub-system 110) exits a sleep mode or a low-power mode (e.g., depending on how long the memory sub-system was in sleep mode or low-power mode). In another instance, the group-based reset read process can be triggered and performed when the memory system (e.g., memory sub-system 110) is in an idle state (e.g., not processing requests or commands from the host system 120) or can be triggered and performed periodically (e.g., periodically performed during the idle state based on a time interval).

At operation 204, the processing device determines (e.g., identifies) a current highest-priority sequence of consecutive blocks (e.g., a first highest-priority sequence of consecutive blocks) identified by the priority-based block pool. For example, the processing device can scan the priority-based block pool to identify the current highest-priority sequence of consecutive blocks. The priority of a given sequence can be expressed or defined by a numerical (priority) value associated with, or assigned to, the given sequence. For some embodiments, the higher the numerical priority value of a sequence, the higher the priority of that sequence. Other forms of assigning priority values can be implemented.

For operation 206, the processing device selects, from a plurality of reset read configurations, a current reset read configuration for the current highest-priority sequence of consecutive blocks, where the current reset read configuration determines a number of consecutive blocks that are reset read in parallel by a reset read operation performed on a memory device (e.g., 130, 140). For example, if the current highest-priority sequence of consecutive blocks comprises sixteen or more consecutive blocks and the plurality of reset read configurations includes a sixteen-block reset read configuration, the processing device can select the sixteen-block reset read configuration as the current reset read configuration. For some embodiments, operation 206 comprises the processing device determines a current operation stage of the memory system (e.g., memory sub-system 110); and in response to determining that the current operation stage satisfies a criterion (e.g., the current operation stage is a power-up stage, exiting sleep mode, exiting low-power mode, or normal operation mode), the processing device selects a predetermined reset read configuration associated with the current operation stage of the memory system as the selected reset read configuration. For example, where the current operation stage is the power-up stage or exiting a sleep mode or a low-power mode, the predetermined reset read configuration can be lower than the highest supported multi-block reset read configuration to ensure lower power usage by reset reads during these stages of the memory system. As another example, in response to determining that the current operation stage comprises a normal operation stage, the processing device can select a given reset read configuration from the plurality of reset read configurations based on a size of the highest-priority sequence of consecutive blocks (e.g., selects the given reset read configuration that reset reads in parallel a number of blocks that best matches the number of blocks currently in the highest-priority sequence of consecutive blocks).

For various embodiments, the plurality of reset read configurations comprises at least one multi-block reset read configuration (e.g., multi-block option, such as four-block, eight-block sixteen-block, and sixty-four-block options). Additionally, for some embodiments, the plurality of reset read configurations comprises at least one single-block reset read configuration (e.g., single-block option). Where the plurality of reset read configurations comprises more than one multi-block reset read configuration, a memory system (e.g., memory sub-system 110) can implement a group-based reset read process with dynamic reset read configuration. The plurality of reset read configurations can represent two or more reset read configurations supported by the memory system (e.g., memory sub-system 110). Additionally, the plurality of reset read configurations available for selection can depend on the current state of the memory system (e.g., memory sub-system 110) when the group-based reset read process is performed on the memory device (e.g., 130, 140). For example, during or after a power-up state, the plurality of reset read configurations can comprise single-block reset read configuration (e.g., single-block option) and four-block reset read configuration (e.g., four-block option), which can limit the amount of power used (e.g., expended) by reset reads performed by the group-based reset read process while the memory system is still booting up (e.g., performing a boot-up process). A similar situation can occur during or after the memory system (e.g., memory sub-system 110) exits a sleep mode or a low-power mode. Eventually, during a normal operation mode (e.g., where the group-based reset read process is performed during idle states), the number of reset read configurations available in the plurality of reset read configurations can increase (e.g., can comprise four-block, eight-block, sixteen-block, and sixty-four-block options).

During operation 208, the processing device determines (e.g., identifies) a current subsequence of consecutive blocks from the current highest-priority sequence of consecutive blocks (determined at operation 204) based on the current reset read configuration (selected by operation 206). For instance, if the current reset read configuration is an eight-block reset read configuration, the current subsequence of consecutive blocks comprises eight consecutive blocks from the current highest-priority sequence of consecutive blocks. The current subsequence can represent all or less than all of the blocks presently in the highest-priority sequence of consecutive blocks (e.g., depends on the number of blocks associated with the current reset read configuration and how many blocks remain in the highest-priority sequence of consecutive blocks. For instance, if the highest-priority sequence of consecutive blocks comprises twenty-four blocks and the current reset read configuration (selected for the highest-priority sequence of consecutive blocks at operation 206) is an eight-block reset read configuration, the current subsequence of consecutive blocks can comprise eight consecutive blocks, which represents less than all of the highest-priority sequence of consecutive blocks.

For some embodiments, blocks of a certain block type can have a higher priority within an individual sequence of consecutive blocks (e.g., the current highest-priority sequence of consecutive blocks) than blocks of another block type. Accordingly, during operation 208, the processing device can determine the current subsequence of consecutive blocks, from the current highest-priority sequence of consecutive blocks, according to the priority of blocks based on block type (e.g., such that blocks in the current subsequence of consecutive blocks are associated with the highest priority block type). For instance, within the current highest-priority sequence of consecutive blocks, blocks having a block type that indicates data associated with an operating system of a host system (e.g., 120) or data that is frequently accessed by the host system can have a higher priority than other block types. As described herein, the block type of a given block can be stored or described in metadata associated with (e.g., maintained by the memory sub-system 110 for) the given block.

At operation 210, the processing device uses the current reset read configuration (selected at operation 206) to perform the reset read operation on the current subsequence of consecutive blocks (determined at operation 208). In particular, based on the current reset read configuration (e.g., four-block, eight-block, sixteen-block, or sixty-four-block reset read option), the processing device can cause a reset read to be performed in parallel across all blocks (e.g., all four, eight, sixteen, or sixty-four blocks) of the current subsequence of consecutive blocks. All the blocks of the current subsequence of consecutive blocks are reset read, those blocks can be removed from the current highest-priority sequence of consecutive blocks in the priority-based block pool. In doing so, the memory system can accurately track which blocks (and how many blocks) of the current highest-priority sequence of consecutive blocks still need to be reset read.

Referring now to the method 300 of FIG. 3A, at operation 302, a processing device (e.g., the processor 117 of the memory sub-system controller 115) maintains a priority-based block pool of blocks of a memory device (e.g., 130, 140), where the priority-based block pool identifies one or more sequences (e.g., series) of consecutive blocks of the memory device, and where the one or more sequences of consecutive blocks are prioritized within the priority-based block pool based on a set of factors. For some embodiments, operation 302 is similar to operation 202 of the method 200 of FIG. 2.

At operation 304, the processing device triggers a group-based reset read process on the memory device (e.g., 130, 140). Operations 306 through 328 can represent operations of a group-based reset read process that is performed on the memory device (e.g., 130, 140). As described herein, the group-based reset read process can be triggered and performed on the memory device (e.g., on the memory device 130, 140 of the memory sub-system 110) under various conditions. For instance, the group-based reset read process can be triggered and performed during or shortly after a power-up stage of a memory system (e.g., memory sub-system 110) or shortly after the memory system (e.g., memory sub-system 110) exits a sleep mode or a low-power mode (e.g., depending on how long the memory sub-system was in sleep mode or low-power mode). In another instance, the group-based reset read process can be triggered and performed when the memory system (e.g., memory sub-system 110) is in an idle state (e.g., not processing requests or commands from the host system 120) or can be triggered and performed periodically (e.g., periodically performed during the idle state based on a time interval).

Thereafter, the method 300 proceeds to operation 306 through operation 312, which can be similar to operations 204 through 210 of the method 200 of FIG. 2.

After operation 312, at operation 314, the processing device determines whether at least one block remains in the current highest-priority sequence of consecutive blocks. At decision block 316, in response to the processing device determining that at least one block remains in the current highest-priority sequence of consecutive blocks, the method 300 proceeds to operation 318, otherwise the method 300 proceeds to operation 320.

At operation 320, the processing device determines (e.g., identifies) a next current highest-priority sequence of consecutive blocks (e.g., second highest-priority sequence of consecutive blocks, third highest-priority sequence of consecutive blocks, fourth highest-priority sequence of consecutive blocks, and so on) identified by the priority-based block pool. Thereafter, the method 300 returns to operation 308, where operation 308 is performed with respect to the next current highest-priority sequence of consecutive blocks (determined at operation 320).

At operation 318, the processing device determines whether a number of remaining blocks in the current highest-priority sequence of consecutive blocks is less than a number of blocks associated with the current reset read configuration (e.g., whether the number of remaining blocks is less than the number of blocks that are reset read based on the current reset read configuration). Referring now to FIG. 3B, at decision block 322, in response to the processing device determining that the number of remaining blocks (in the current highest-priority sequence of consecutive blocks) is less than the number of blocks associated with the current reset read configuration, the method 300 proceeds to operation 326, otherwise the method 300 proceeds to operation 324.

Continuing with FIG. 3B, at operation 324, the processing device determines (e.g., identifies) a next current subsequence of consecutive blocks (e.g., second subsequence of consecutive blocks, third subsequence of consecutive blocks, fourth subsequence of consecutive blocks, and so on) from the current highest-priority sequence of consecutive blocks (determined at operation 306) based on the current reset read configuration (selected by operation 308). Thereafter, the method 300 returns to operation 312, where operation 312 is operated on the current subsequence of consecutive blocks determined at operation 324.

Continuing with FIG. 3B, at operation 326, the processing device selects, from the plurality of reset read configurations, a next current reset read configuration (e.g., second reset read configuration, third reset read configuration, and so on) for the current highest-priority sequence of consecutive blocks. Subsequently, at operation 328, the processing device determines (e.g., identifies) a next current subsequence of consecutive blocks (e.g., second subsequence of consecutive blocks, third subsequence of consecutive blocks, fourth subsequence of consecutive blocks, and so on) from the current highest-priority sequence of consecutive blocks (determined at operation 306) based on the current reset read configuration (selected by operation 326). Thereafter, the method 300 returns to operation 310, where operation 310 is performed on the current subsequence of consecutive blocks determined at operation 328.

Figure 4:
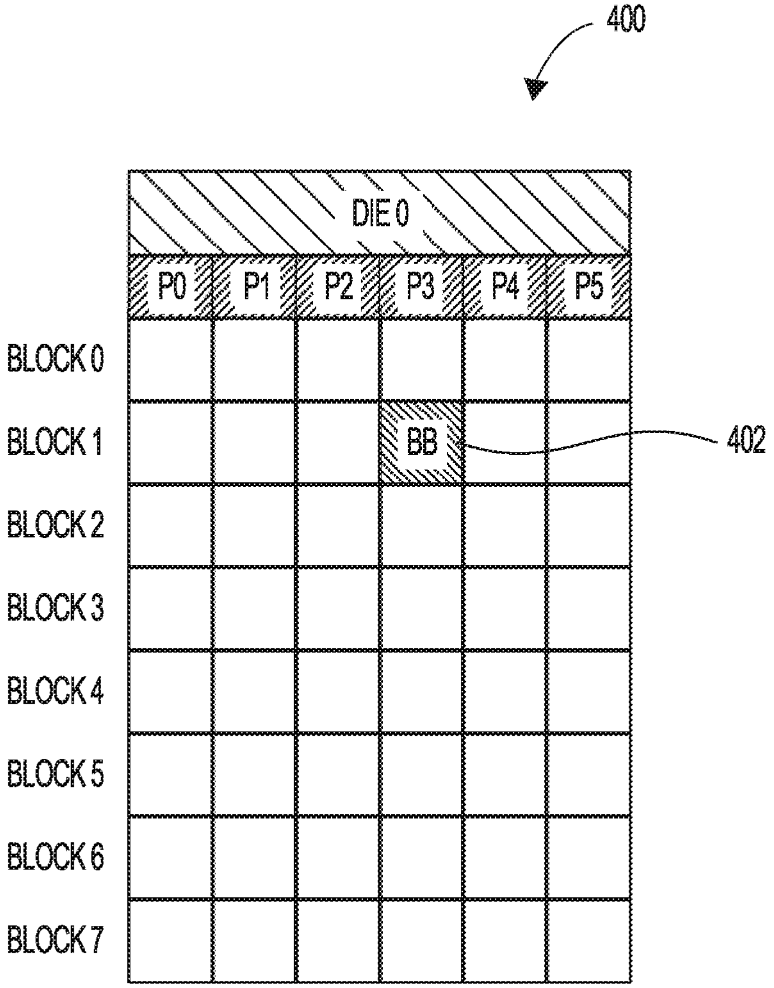
FIG. 4 is a diagram illustrating an example memory die of a memory device upon which a reset read operation can be performed using a priority-based block pool, in accordance with some embodiments of the present disclosure.

FIG. 4 is a diagram illustrating an example memory die 400 of a memory device upon which a reset read operation can be performed using a priority-based block pool, in accordance with some embodiments of the present disclosure. As shown, memory die 400 (e.g., die 0) comprises memory die planes P0 through P5, with each of those memory die planes comprising blocks 0 through 7. As also shown, block 1 (402) of memory die plane P3 is determined to be a bad block. According to various embodiments, a memory system (e.g., memory sub-system 110) can determine (e.g., generate) a priority-based block pool that identifies blocks 0 through 7, of each of memory die planes P0, P1, P2, P4, and P5, as a different sequence of blocks, identifies blocks 2 through 7 of memory die plane P3 as a lower-priority sequence of blocks, and identifies block 0 of memory die plane P3 as an even lower-priority sequence of blocks (e.g., sequence comprising a single block).

Figure 6:
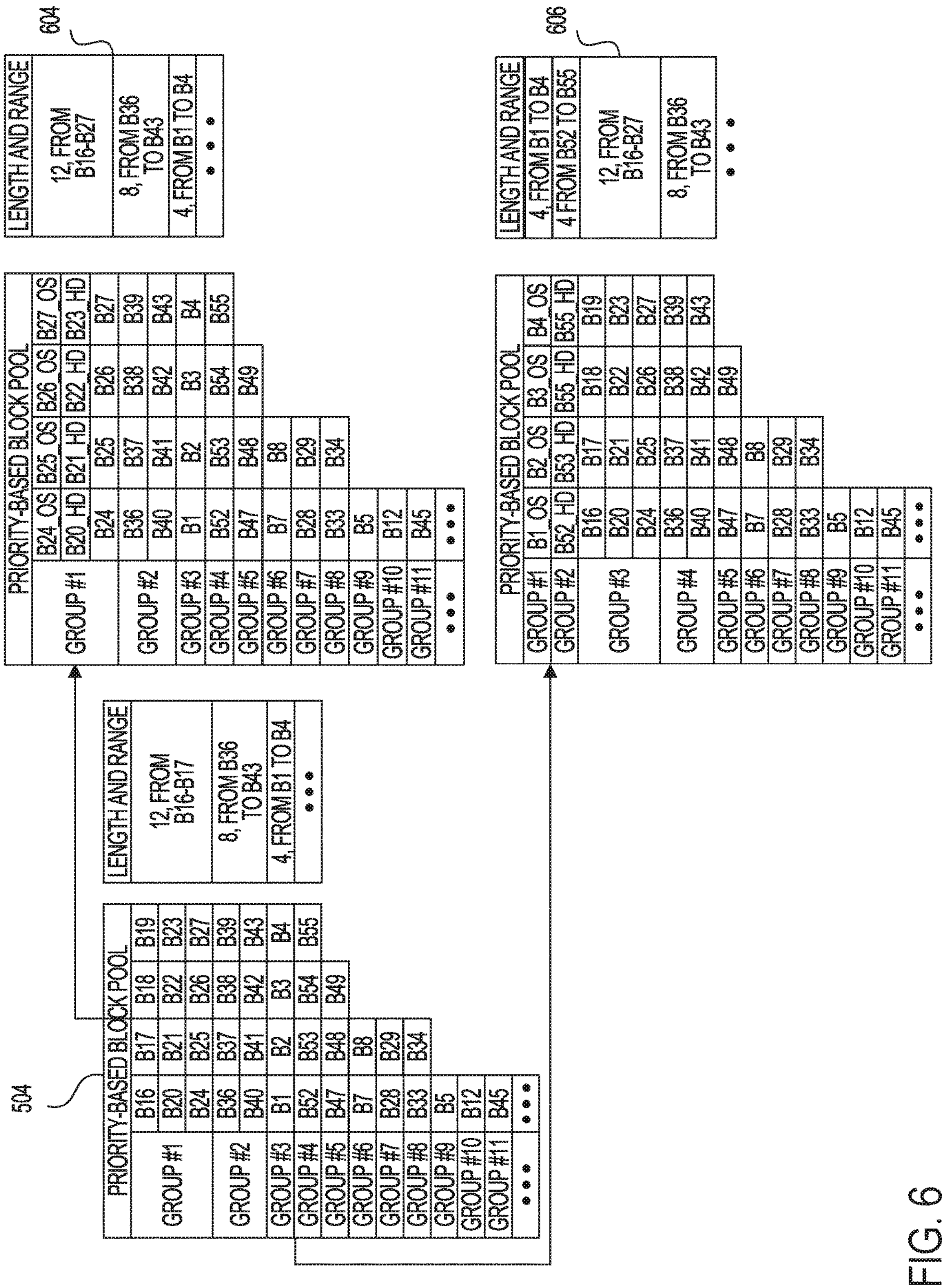

FIG. 5 and FIG. 6 are diagrams illustrating use of a priority-based block pool to perform a reset read operation on a memory device, in accordance with some embodiments of the present disclosure. Referring now to FIG. 5, FIG. 5 illustrates a priority-based block pool 504 being maintained or generated based on a current good block pool 502. According to various embodiments, the priority-based block pool 504 illustrates a pool that identifies one or more sequences of consecutive blocks (e.g., consecutive good blocks) of a memory device. Each group in the priority-based block pool 504 represents a different sequence of consecutive blocks of the memory device. As described herein, during a GRR process, one or more subsequences of consecutive blocks can be identified from each sequence of consecutive blocks and operated upon. For some embodiments, the current good block pool 502 can comprise a pool (e.g., maintained by the memory system) that identifies blocks of a memory device (e.g., 130, 140) considered to be good by a memory system (e.g., memory sub-system 110). For various embodiments, the memory system identifies sequences of consecutive good blocks for the priority-based block pool 504 based on good blocks identified in the current good block pool 502. As shown, group #1 represents a sequence of consecutive blocks B16-B27 of the memory device with the highest priority based on length (of twelve blocks), group #2 represents a sequence of consecutive blocks B36-B43 of the memory device with the second highest priority based on length (of eight blocks), group #3 represents a sequence of consecutive blocks B1-B4 of the memory device with the third highest priority based on length (of four blocks), and so on. Groups #9 through #11 each represent a sequence of a single block (each with a length of one block) and have the lowest priority in the priority-based block pool 504.

Referring now to FIG. 6, an adjusted priority-based block pool 604 represents how subsequences of consecutive blocks within a select sequence of consecutive blocks can be adjusted based on block type, and an adjusted priority-based block pool 606 represents how priorities of sequences of consecutive blocks in the priority-based block pool 504 can be adjusted based on block type. As described herein, blocks of certain block types (e.g., data associated with a host system's operating system, or data frequently accessed by a host system) can be assigned a higher priority within the priority-based block pool 504 over blocks of other block types.

As shown in the adjusted priority-based block pool 604, within group #1 (comprising consecutive blocks B16 through B27), first subsequence of consecutive blocks B24_OS through B27_OS store data associated with an operating system of a host system (e.g., 120), and second subsequence of consecutive blocks B20_HD through B23_HD store (hot) data that is frequently accessed by (e.g., frequent read requests from) a host system (e.g., 120). As further shown, the first subsequence (storing data associated with the operating system) has the highest priority in group #1 based on the data associated with the operating system, the second subsequence (storing hot data) has the second highest priority in group #1 based on the data associated with the hot data, and third (last) subsequence of consecutive blocks B16 through B19 storing data of another type has the lowest priority in group #1.

In the adjusted priority-based block pool 606, group #1 represents a first sequence of consecutive blocks B1_OS through B4_OS store data associated with an operating system of a host system (e.g., 120), and group #2 represents a second sequence of consecutive blocks B20_HD through B23_HD store (hot) data that is frequently accessed by (e.g., frequent read requests from) a host system (e.g., 120). As further shown, the first subsequence (storing data associated with the operating system) has the highest priority in the adjusted priority-based block pool 606 (despite having a length of only four blocks) based on the data associated with the operating system, the second subsequence (storing hot data) has the second highest priority in the adjusted priority-based block pool 606 (despite having a length of only four blocks) based on the hot data, and all remaining groups (all other sequences of consecutive blocks) are prioritized according to their respective sequences lengths.

Figure 7:
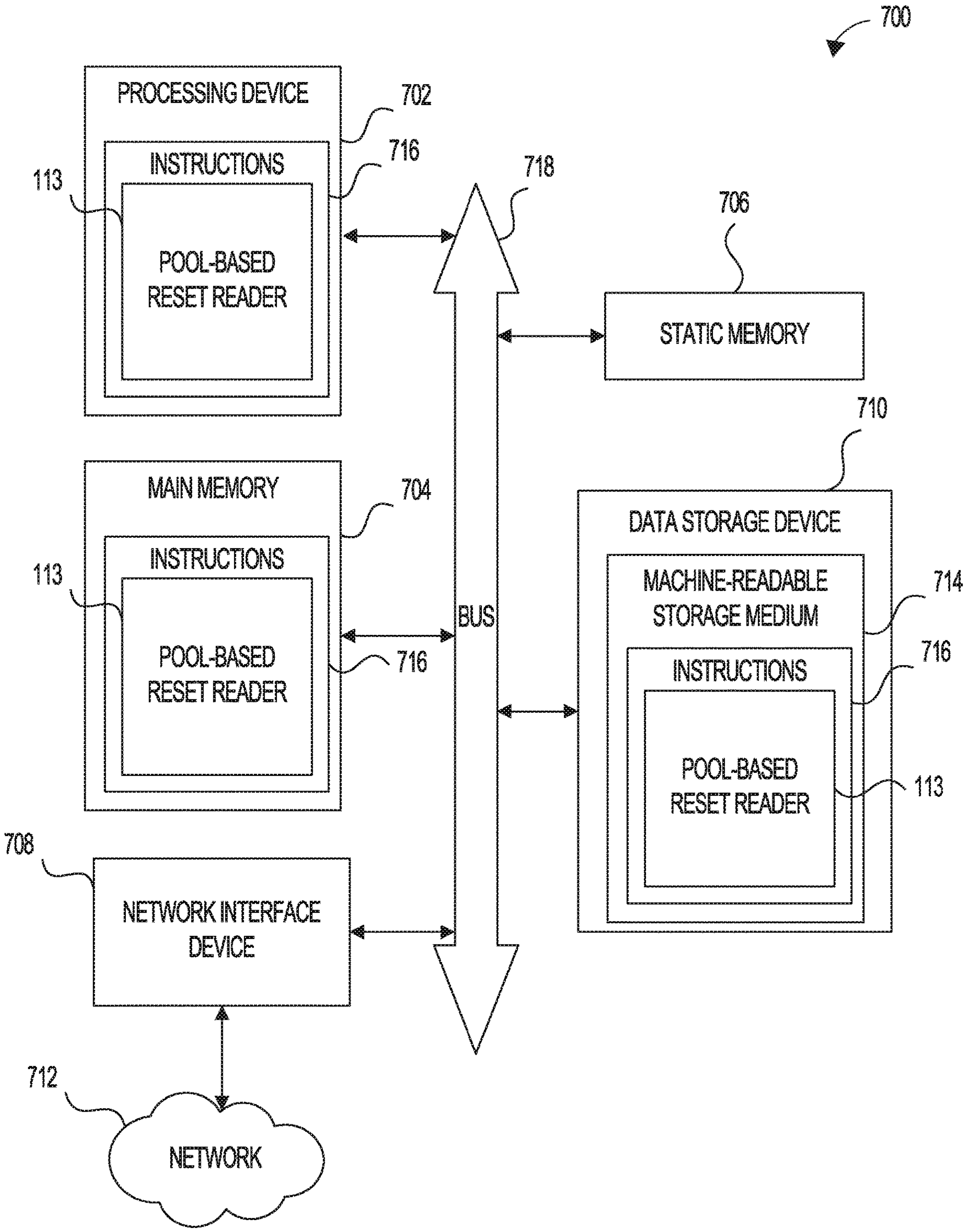
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or Rambus DRAM (RDRAM), etc.), a static memory 706 (e.g., flash memory, static random access memory (SRAM), etc.), and a data storage device 710, which communicate with each other via a bus 718.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application-specific integrated circuit (ASIC), a field programmable gate array (FPGA), a digital signal processor (DSP), a network processor, or the like. The processing device 702 is configured to execute instructions 716 for performing the operations and steps discussed herein. The computer system 700 can further include a network interface device 708 to communicate over a network 712.

The data storage device 710 can include a machine-readable storage medium 714 (also known as a computer-readable medium) on which is stored one or more sets of instructions 716 or software embodying any one or more of the methodologies or functions described herein. The instructions 716 can also reside, completely or at least partially, within the main memory 704 and/or within the processing device 702 during execution thereof by the computer system 700, the main memory 704 and the processing device 702 also constituting machine-readable storage media. The machine-readable storage medium 714, data storage device 710, and/or main memory 704 can correspond to the memory sub-system 110 of FIG. 1.

In one embodiment, the instructions 716 include instructions to implement functionality corresponding to performing a reset read operation on a memory device using a priority-based block pool as described herein (e.g., the pool-based reset reader 113 of FIG. 1). While the machine-readable storage medium 714 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device; and a processing device, operatively coupled to the memory device, configured to perform operations comprising: maintaining a priority-based block pool of blocks of the memory device, the priority-based block pool identifying one or more sequences of consecutive blocks of the memory device, the one or more sequences of consecutive blocks being prioritized within the priority-based block pool based on a set of factors, the set of factors comprising a factor that increases a priority of an individual sequence of consecutive blocks based on a size of the individual sequence of consecutive blocks; determining a highest-priority sequence of consecutive blocks identified by the priority-based block pool; selecting, from a plurality of reset read configurations, a reset read configuration for the highest-priority sequence of consecutive blocks, the plurality of reset read configurations comprising at least one multi-block reset read configuration, the selected reset read configuration determining a number of consecutive blocks that are reset read in parallel by a reset read operation; determining a subsequence of consecutive blocks from the highest-priority sequence of consecutive blocks based on the selected reset read configuration; and using the selected reset read configuration to perform the reset read operation on the subsequence of consecutive blocks.

In Example 2, the subject matter of Example 1 includes, wherein the subsequence of consecutive blocks is a first subsequence of consecutive blocks, and wherein the operations comprise: after using the selected reset read configuration to perform the reset read operation on the subsequence of consecutive blocks: determining a second subsequence of consecutive blocks from the highest-priority sequence of consecutive blocks based on the selected reset read configuration; and using the selected reset read configuration to perform the reset read operation on the second subsequence of consecutive blocks.

In Example 3, the subject matter of Examples 1-2 includes, wherein the subsequence of consecutive blocks is a first subsequence of consecutive blocks, wherein the selected reset read configuration is a first selected reset read configuration, wherein the number of consecutive blocks is a first number of consecutive blocks, and wherein the operations comprise: after using the selected reset read configuration to perform the reset read operation on the subsequence of consecutive blocks: determining whether a number of remaining blocks in the highest-priority sequence of consecutive blocks is less than a number of blocks associated with the first selected reset read configuration; and in response to determining that the number of remaining blocks is not less than the number of blocks associated with the first selected reset read configuration: selecting, from the plurality of reset read configurations, a second reset read configuration for the highest-priority sequence of consecutive blocks, the second reset read configuration determining a second number of consecutive blocks that are reset read in parallel by a reset read operation, the second number of consecutive blocks being less than the first number of consecutive blocks; determining a second subsequence of consecutive blocks from the highest-priority sequence of consecutive blocks based on the second selected reset read configuration; and using the second selected reset read configuration to perform the reset read operation on the second subsequence of consecutive blocks.

In Example 4, the subject matter of Examples 1-3 includes, wherein the subsequence of consecutive blocks is a first subsequence of consecutive blocks, wherein the selected reset read configuration is a first selected reset read configuration, and wherein the operations comprise: after all blocks of the highest-priority sequence of consecutive blocks have been reset read: determining a next highest-priority sequence of consecutive blocks identified by the priority-based block pool; selecting, from the plurality of reset read configurations, a second reset read configuration for the next highest-priority sequence of consecutive blocks; determining a second subsequence of consecutive blocks from the next highest-priority sequence of consecutive blocks based on the second selected reset read configuration; and using the second selected reset read configuration to perform the reset read operation on the second subsequence of consecutive blocks.

In Example 5, the subject matter of Examples 1~4 includes, wherein the selecting of the reset read configuration for the highest-priority sequence of consecutive blocks comprises: determining a current operation stage of the system; and in response to determining that the current operation stage comprises a power-up stage, selecting a predetermined reset read configuration associated with the power-up stage as the selected reset read configuration.

In Example 6, the subject matter of Examples 1-5 includes, wherein the selecting of the reset read configuration for the highest-priority sequence of consecutive blocks comprises: determining a current operation stage of the system; and in response to determining that the current operation stage comprises a normal operation stage, selecting a given reset read configuration from the plurality of reset read configurations based on a size of the highest-priority sequence of consecutive blocks.

In Example 7, the subject matter of Examples 1-6 includes, wherein the plurality of reset read configurations comprises a single-block reset read configuration.

In Example 8, the subject matter of Examples 1-7 includes, wherein the at least one multi-block reset read configuration is one of: a four-block configuration, sixteen-block configuration, or a sixty-four-block configuration.

In Example 9, the subject matter of Examples 1-8 includes, where the maintaining of the priority-based block pool of blocks comprises: determining the one or more sequences of consecutive blocks based on a good block pool maintained by the system.

In Example 10, the subject matter of Examples 1-9 includes, wherein the factor is a first factor, and wherein the set of factors comprises a second factor that increases the priority of the individual sequence of consecutive blocks based on a block type of blocks of the individual sequence of consecutive blocks.

In Example 11, the subject matter of Example 10 includes, wherein the block type comprises blocks that store data for an operating system of a host system.

In Example 12, the subject matter of Examples 10-11 includes, wherein the block type comprises blocks that store data frequently accessed by a host system.

In Example 13, the subject matter of Examples 1-12 includes, wherein the determining of the subsequence of consecutive blocks from the highest-priority sequence of consecutive blocks based on the selected reset read configuration comprises: determining the subsequence of consecutive blocks from the highest-priority sequence of consecutive blocks based on the selected reset read configuration and based a priority of one or more block types of blocks of the highest-priority sequence of consecutive blocks.

Example 14 is a method to implement any of Examples 1-13.

Example 15 is at least one machine-readable medium comprising instructions that, when executed by a processing device, cause the processing device to perform operations to implement any of Examples 1-13.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A system comprising:

a memory device; and a processing device, operatively coupled to the memory device, configured to perform operations comprising:

maintaining a priority-based block pool of blocks of the memory device, the priority-based block pool identifying one or more sequences of consecutive blocks of the memory device, the one or more sequences of consecutive blocks being prioritized within the priority-based block pool based on a set of factors, the set of factors comprising a factor that increases a priority of an individual sequence of consecutive blocks based on a size of the individual sequence of consecutive blocks;

determining a highest-priority sequence of consecutive blocks identified by the priority-based block pool;

selecting, from a plurality of reset read configurations, a reset read configuration for the highest-priority sequence of consecutive blocks, the plurality of reset read configurations comprising at least one multi-block reset read configuration, the selected reset read configuration determining a number of consecutive blocks that are reset read in parallel by a reset read operation;

determining a subsequence of consecutive blocks from the highest-priority sequence of consecutive blocks based on the selected reset read configuration; and using the selected reset read configuration to perform the reset read operation on the subsequence of consecutive blocks.

2. The system of claim 1, wherein the subsequence of consecutive blocks is a first subsequence of consecutive blocks, and wherein the operations further comprise:

after using the selected reset read configuration to perform the reset read operation on the subsequence of consecutive blocks:

determining a second subsequence of consecutive blocks from the highest-priority sequence of consecutive blocks based on the selected reset read configuration; and using the selected reset read configuration to perform the reset read operation on the second subsequence of consecutive blocks.

3. The system of claim 1, wherein the subsequence of consecutive blocks is a first subsequence of consecutive blocks, wherein the selected reset read configuration is a first selected reset read configuration, wherein the number of consecutive blocks is a first number of consecutive blocks, and wherein the operations further comprise:

after using the selected reset read configuration to perform the reset read operation on the subsequence of consecutive blocks:

determining whether a number of remaining blocks in the highest-priority sequence of consecutive blocks that have not been reset read is less than the first number of consecutive blocks; and in response to determining that the number of remaining blocks is not less than the number of blocks associated with the first number of consecutive blocks:

selecting, from the plurality of reset read configurations, a second reset read configuration for the highest-priority sequence of consecutive blocks, the second reset read configuration determining a second number of consecutive blocks that are reset read in parallel by a reset read operation, the second number of consecutive blocks being less than the first number of consecutive blocks;

determining a second subsequence of consecutive blocks from the highest-priority sequence of consecutive blocks based on the second selected reset read configuration; and using the second selected reset read configuration to perform the reset read operation on the second subsequence of consecutive blocks.

4. The system of claim 1, wherein the subsequence of consecutive blocks is a first subsequence of consecutive blocks, wherein the selected reset read configuration is a first selected reset read configuration, and wherein the operations further comprise:

after all blocks of the highest-priority sequence of consecutive blocks have been reset read:

determining a next highest-priority sequence of consecutive blocks identified by the priority-based block pool;

selecting, from the plurality of reset read configurations, a second reset read configuration for the next highest-priority sequence of consecutive blocks;

determining a second subsequence of consecutive blocks from the next highest-priority sequence of consecutive blocks based on the second selected reset read configuration; and using the second selected reset read configuration to perform the reset read operation on the second subsequence of consecutive blocks.

5. The system of claim 1, wherein the selecting of the reset read configuration for the highest-priority sequence of consecutive blocks comprises:

determining a current operation stage of the system; and in response to determining that the current operation stage comprises a power-up stage, selecting a predetermined reset read configuration associated with the power-up stage as the selected reset read configuration.

6. The system of claim 1, wherein the selecting of the reset read configuration for the highest-priority sequence of consecutive blocks comprises:

determining a current operation stage of the system; and in response to determining that the current operation stage comprises a normal operation stage, selecting a given reset read configuration from the plurality of reset read configurations based on a size of the highest-priority sequence of consecutive blocks.

7. The system of claim 1, wherein the plurality of reset read configurations comprises a single-block reset read configuration.

8. The system of claim 1, wherein the at least one multi-block reset read configuration is one of: four-block configuration, sixteen-block configuration, or a sixty-four-block configuration.

9. The system of claim 1, where the maintaining of the priority-based block pool of blocks comprises:

determining the one or more sequences of consecutive blocks based on a good block pool maintained by the system.

10. The system of claim 1, wherein the factor is a first factor, and wherein the set of factors comprises a second factor that increases the priority of the individual sequence of consecutive blocks based on a block type of blocks of the individual sequence of consecutive blocks.

11. The system of claim 10, wherein the block type comprises blocks that store data for an operating system of a host system.

12. The system of claim 10, wherein the block type comprises blocks that store data frequently accessed by a host system.

13. The system of claim 1, wherein the determining of the subsequence of consecutive blocks from the highest-priority sequence of consecutive blocks based on the selected reset read configuration comprises:

determining the subsequence of consecutive blocks from the highest-priority sequence of consecutive blocks based on the selected reset read configuration and based a priority of one or more block types of blocks of the highest-priority sequence of consecutive blocks.

14. At least one non-transitory machine-readable storage medium comprising instructions that, when executed by a processing device, cause the processing device to perform operations comprising:

maintaining a priority-based block pool of blocks of a memory device, the priority-based block pool identifying one or more sequences of consecutive blocks of the memory device, the one or more sequences of consecutive blocks being prioritized within the priority-based block pool based on a set of factors, the set of factors comprising a factor that increases a priority of an individual sequence of consecutive blocks based on a size of the individual sequence of consecutive blocks;

determining a highest-priority sequence of consecutive blocks identified by the priority-based block pool;

selecting, from a plurality of reset read configurations, a reset read configuration for the highest-priority sequence of consecutive blocks, the plurality of reset read configurations comprising at least one multi-block reset read configuration, the selected reset read configuration determining a number of consecutive blocks that are reset read in parallel by a reset read operation;

determining a subsequence of consecutive blocks from the highest-priority sequence of consecutive blocks based on the selected reset read configuration; and using the selected reset read configuration to perform the reset read operation on the subsequence of consecutive blocks.

15. The at least one non-transitory machine-readable storage medium of claim 14, wherein the subsequence of consecutive blocks is a first subsequence of consecutive blocks, and wherein the operations further comprise:

after using the selected reset read configuration to perform the reset read operation on the subsequence of consecutive blocks:

determining a second subsequence of consecutive blocks from the highest-priority sequence of consecutive blocks based on the selected reset read configuration; and using the selected reset read configuration to perform the reset read operation on the second subsequence of consecutive blocks.

16. The at least one non-transitory machine-readable storage medium of claim 14, wherein the subsequence of consecutive blocks is a first subsequence of consecutive blocks, wherein the selected reset read configuration is a first selected reset read configuration, wherein the number of consecutive blocks is a first number of consecutive blocks, and wherein the operations further comprise:

after using the selected reset read configuration to perform the reset read operation on the subsequence of consecutive blocks:

determining whether a number of remaining blocks in the highest-priority sequence of consecutive blocks that have not been reset read is less than the first number of consecutive blocks; and in response to determining that the number of remaining blocks is not less than the number of blocks associated with the first number of consecutive blocks:

selecting, from the plurality of reset read configurations, a second reset read configuration for the highest-priority sequence of consecutive blocks, the second reset read configuration determining a second number of consecutive blocks that are reset read in parallel by a reset read operation, the second number of consecutive blocks being less than the first number of consecutive blocks;

determining a second subsequence of consecutive blocks from the highest-priority sequence of consecutive blocks based on the second selected reset read configuration; and using the second selected reset read configuration to perform the reset read operation on the second subsequence of consecutive blocks.

17. The at least one non-transitory machine-readable storage medium of claim 14, wherein the selecting of the reset read configuration for the highest-priority sequence of consecutive blocks comprises:

determining a current operation stage of a memory system that comprises the memory device; and in response to determining that the current operation stage comprises a power-up stage, selecting a predetermined reset read configuration associated with the power-up stage as the selected reset read configuration.

18. The at least one non-transitory machine-readable storage medium of claim 14, wherein the selecting of the reset read configuration for the highest-priority sequence of consecutive blocks comprises:

determining a current operation stage of a memory system that comprises the memory device; and in response to determining that the current operation stage comprises a normal operation stage, selecting a given reset read configuration from the plurality of reset read configurations based on a size of the highest-priority sequence of consecutive blocks.

19. The at least one non-transitory machine-readable storage medium of claim 14, wherein the plurality of reset read configurations comprises a single-block reset read configuration.

20. A method comprising:

maintaining, by a processing device, a priority-based block pool of blocks of a memory device, the priority-based block pool identifying one or more sequences of consecutive blocks of the memory device, the one or more sequences of consecutive blocks being prioritized within the priority-based block pool based on a set of factors, the set of factors comprising a factor that increases a priority of an individual sequence of consecutive blocks based on a size of the individual sequence of consecutive blocks;

determining, by the processing device, a highest-priority sequence of consecutive blocks identified by the priority-based block pool;

selecting, by the processing device and from a plurality of reset read configurations, a reset read configuration for the highest-priority sequence of consecutive blocks, the plurality of reset read configurations comprising at least one multi-block reset read configuration, the selected reset read configuration determining a number of consecutive blocks that are reset read in parallel by a reset read operation;

determining, by the processing device, a subsequence of consecutive blocks from the highest-priority sequence of consecutive blocks based on the selected reset read configuration; and using, by the processing device, the selected reset read configuration to perform the reset read operation on the subsequence of consecutive blocks.

* * * * *